United States Patent [19]
Bennett

[11] 4,082,440
[45] Apr. 4, 1978

[54] COMPACT MICROFORM READER

[75] Inventor: Frank P. Bennett, Franklin Lakes, N.J.

[73] Assignee: GAF Corporation, New York, N.Y.

[21] Appl. No.: 621,984

[22] Filed: Oct. 14, 1975

[51] Int. Cl.² ............... G03B 23/12; G03B 21/22
[52] U.S. Cl. ........................ 353/26 R; 353/43; 353/74; 353/75; 353/82; 350/241; 353/78
[58] Field of Search ............ 353/7, 8, 21, 39, 79, 353/82, 75, 76, 74, 77, 78, 27, 26 R, 43; 350/35, 241, 133, 134, 135, 141, 142, 143; 40/106.1

[56] References Cited

U.S. PATENT DOCUMENTS

| | | | |
|---|---|---|---|
| 1,349,018 | 8/1920 | Terashima | 350/137 |
| 2,472,259 | 6/1949 | McPherson | 353/10 |
| 2,485,411 | 10/1949 | Pratt et al. | 350/35 |
| 2,517,170 | 8/1950 | Bernard | 40/106.1 |
| 2,674,919 | 4/1954 | Rodriguez | 353/7 |
| 2,735,337 | 2/1956 | Frischmann | 350/35 |
| 3,072,013 | 1/1963 | Pratt | 353/78 |
| 3,143,920 | 8/1964 | Hawkins | 353/21 |
| 3,261,977 | 7/1966 | Van Der Velden | 353/7 |
| 3,659,933 | 5/1972 | Weitz | 353/21 |

FOREIGN PATENT DOCUMENTS

| | | | |
|---|---|---|---|
| 818,513 | 6/1937 | France | 353/74 |
| 246,723 | 1/1947 | Switzerland | 353/74 |

Primary Examiner—Richard E. Aegerter
Assistant Examiner—John W. Shepperd
Attorney, Agent, or Firm—Walter C. Kehm; Arthur Dresner

[57] ABSTRACT

A portable microform reader is provided with a microform carrier and a projection system for projecting an enlarged real image of the information carried on a portion of the microform onto a viewing screen. A binocular magnifying system is arranged for viewing the screen and for further enlarging the image thereon to produce a virtual image of acceptable reading size. The projection system comprises a source of illumination, a condenser lens, and a projection lens for projecting an image of the information carried on the microform onto the screen. The magnifying system may consist of appropriate binocular lenses where such lenses, in combination with prismatic converging means, produce the desired magnification. Beam splitting means may alternately be provided to eliminate the need for prismatic converging means, and a mirror arrangement may be provided to "fold" the projected beams for further limiting the size of the reader.

6 Claims, 4 Drawing Figures

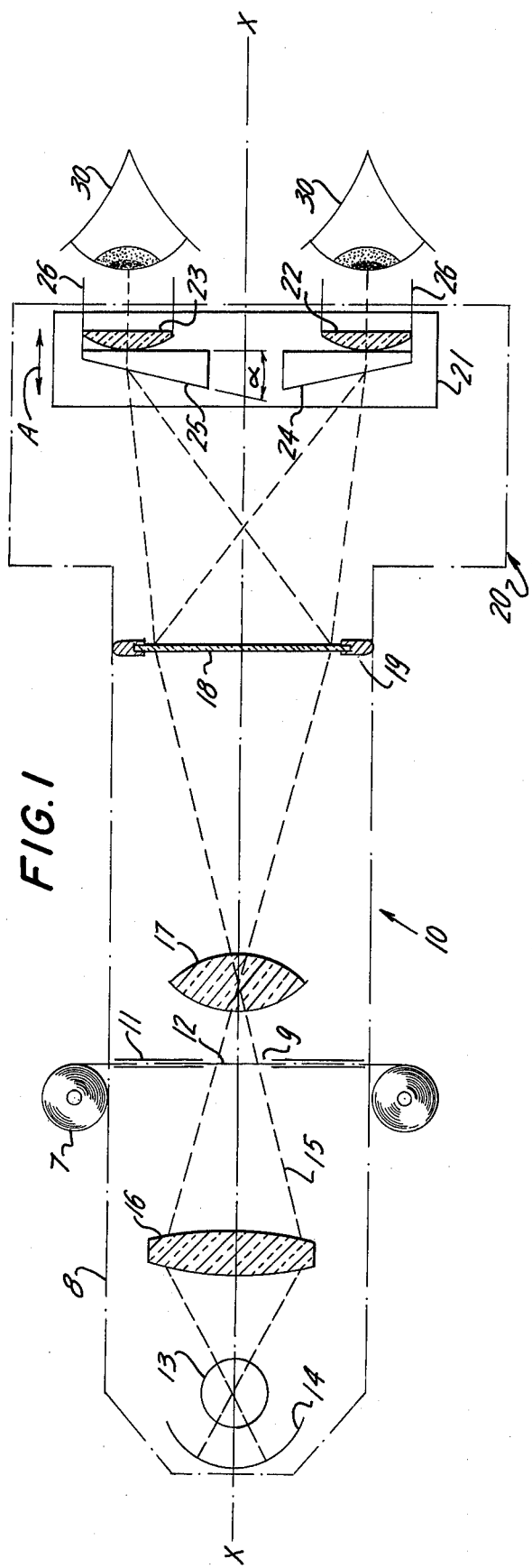
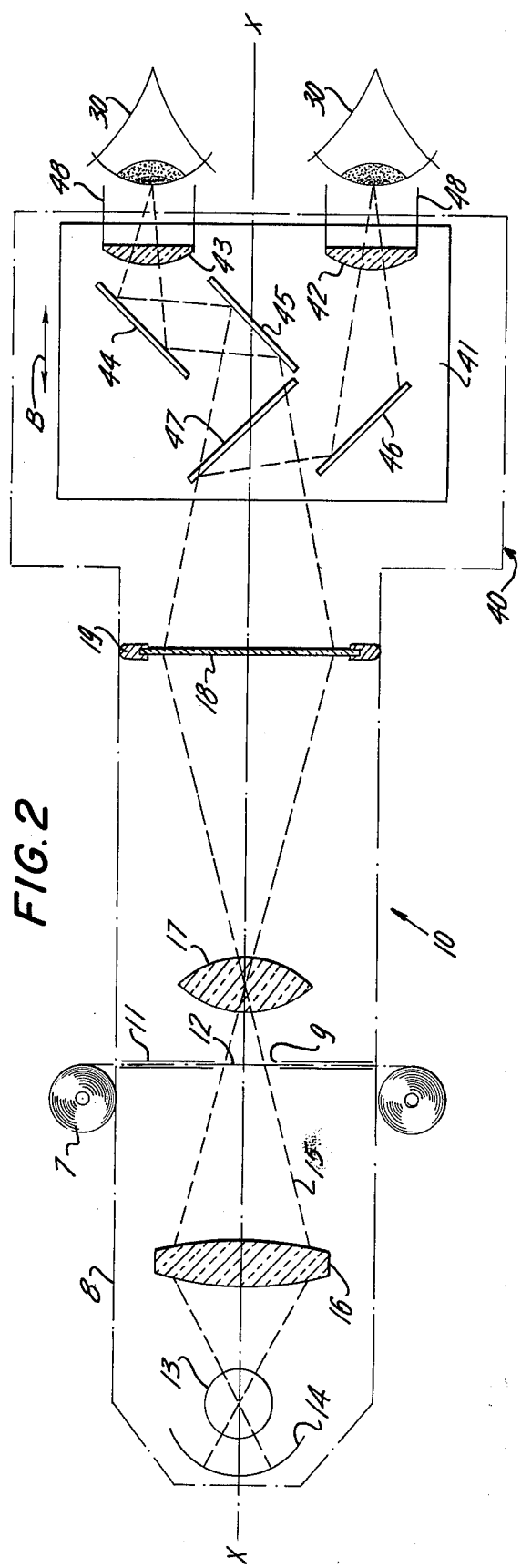

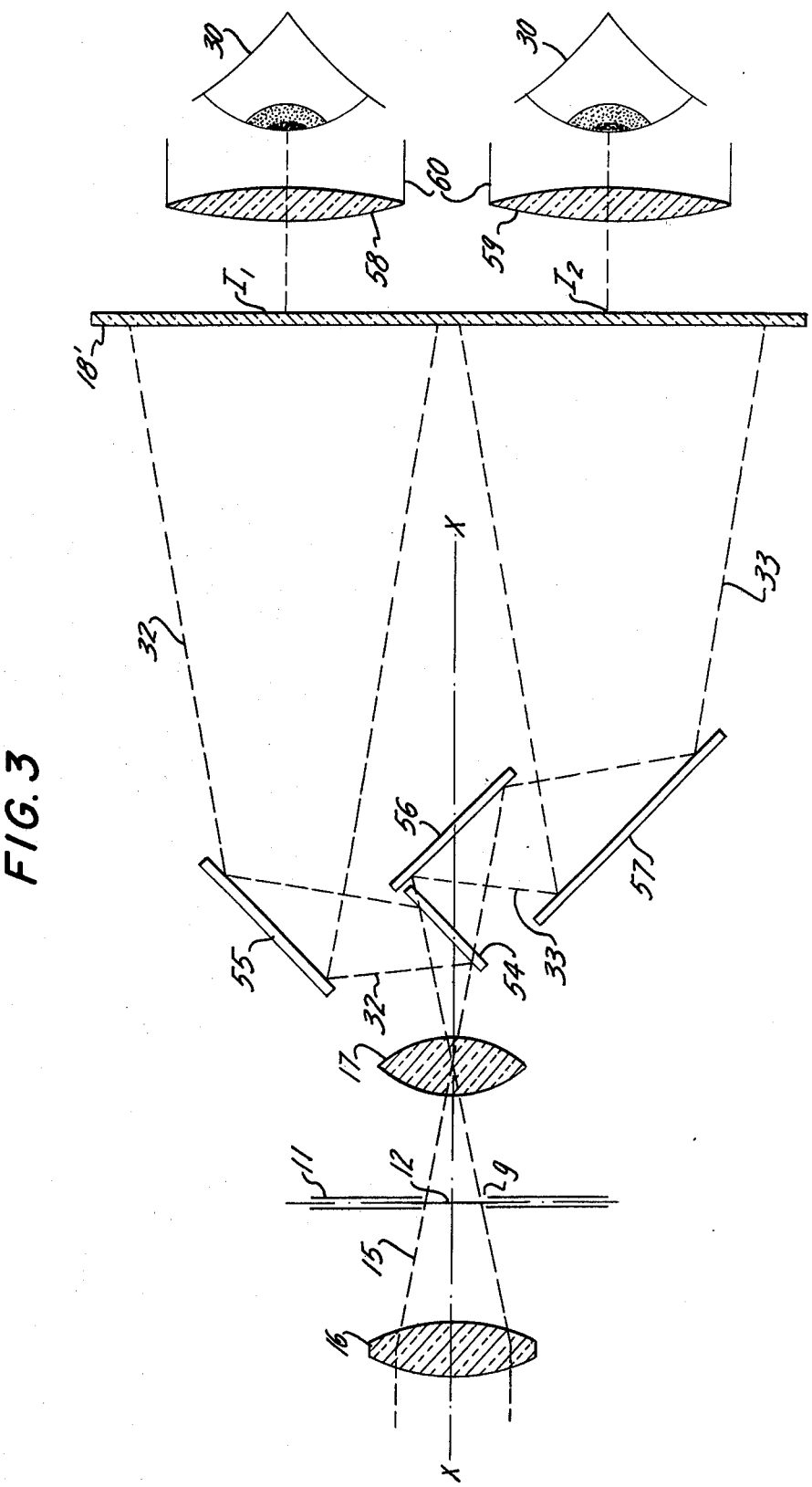

COMPACT MICROFORM READER

BACKGROUND OF THE INVENTION

The present invention relates generally to the field of visual display or magnifying devices of the type for viewing or reading information carried on a microform. More particularly, the invention is directed to such a viewer or reader device which is compact in size and suitable for portable use.

Microform viewers or readers are well known in the art, the most popular of which are the desk or tabletop models which project an image representing the information carried on a microform, onto a rear projection viewing screen. The most common of these desk or tabletop models provides optical systems employing appropriate distances between lenses, mirrors and the screen, so that the image portrayed on the viewing screen will be as near as possible to the full size of the original duplicated on the microform. Because the microform carries the recorded information in a greatly reduced size, magnification to the full original size requires a screen which will accommodate such full size. Additionally, the housing must be sufficiently large to accommodate the required optical path and occlude stray light. Accordingly, such devices have been relatively large in size and unsuitable for portable use. This system does provide many advantages, such as being capable of producing legible, clear and sufficiently enlarged images of the information recorded on the microform for easy viewing. While these devices have generally been successful, their use is limited by their size and does not allow for portability so that the viewer can be carried by the user to any desired location.

Portable microform viewers have been suggested in which the image to be viewed is projected upon a screen, however such devices to reproduce the recorded image at full size are also relatively large and require complicated and expensive folding arrangements to minimize size. These devices also require considerable power in the illumination system to overcome the ambient light in a lighted work area thus requiring a large battery pack for true portable operation.

Other prior art attempts at providing portable microform reader devices have included simple magnifying optical arrangements having a microform holder and a magnifying lens arrangement positioned with respect to the holder so that monocular viewing through the magnifying lens system produces an enlarged virtual image of the reduced information recorded on the microform. This type of device has the advantage of being capable of producing particularly large magnifications of the microform information while maintaining extreme compactness. This type of device, however, suffers from other disadvantages. For example, such systems have severe optical limitations, particularly with respect to the high magnifications and field of view required for normal viewing of microforms. This limitation relates principally to the limitations for eye relief at the viewing lens and the need for accuracy and steadiness with respect to eye alignment along the optical axis. Such disadvantages quickly produce fatigue and discomfort when using such devices.

It is accordingly one object of the present invention to provide a microform reader or viewer of compact dimensions which overcomes many of the disadvantages of the prior art devices.

A further object of the present invention is to provide a microform reader which combines the best features of both the projection or screen viewing type of reader with the magnifying type of reader.

Another object of the present invention is to provide a compact microform reader or viewer which is provided with a viewing screen upon which a real image is projected to an enlarged image, in combination with a magnifying system for producing a further enlarged virtual image.

Yet another object of the present invention is to provide a compact microform reader which is portable, easy to use, will not provide fatigue or difficulty with respect to alignment of the eye along the optical axis, and which requires only a low power magnifying system.

The above objects, features and advantages, along with other objects, features and advantages of the present invention will become more apparent from the detailed description of the invention, in conjunction with the accompanying drawings to be described more fully hereinafter.

SUMMARY OF THE INVENTION

The foregoing objects are generally achieved by providing a compact portable microform reader having a microform carrier, and a projection system for projecting a real image of information carried on the microform onto a viewing screen of reduced size. A binocular magnifying system cooperates with the viewing screen for enlarging the image thereon to acceptable reading size. The projection system comprises a source of illumination, a condenser lens, and a projection lens for projecting the image onto the screen. The magnifying system may consist of appropriate binocular lenses or such lenses in combination with prism means to produce desired magnification.

More specifically, the invention provides for a light tight housing, a microform carrier within said housing for supporting a microform for viewing, a projection system carried within said housing for projecting an image of a portion of said microform onto the rear side of a projection screen, said projection screen being supported within said housing and being translucent so that said projected image may be viewed on the front side thereof, a magnifying system carried on means for focusing adjustment within said housing in optical alignment with the image upon said screen for viewing an enlarged virtual image thereof.

The projection system of the present invention includes a source of illumination, a condenser lens positioned between said source of illumination and the microform carrier and a projection lens positioned for projecting an image of a portion of the microform onto the screen. The illuminating means and condensing lens operate to pass a beam of illumination through the portion of the microform to be viewed and through the projection lens.

In one embodiment of the invention, the magnifying system comprises a pair of magnifying lenses interocularly spaced for binocular viewing of the image displayed on the screen. A prismatic element is associated with each of said elements to produce eye convergents of the image on the screen.

In a further embodiment of the present invention, the magnifying system includes beam splitting means for dividing the optical path from the image displayed on the screen into first and second viewing paths. First and second magnifying lenses are optically aligned with the first and second viewing paths for binocular viewing of a magnified virtual image of the real image displayed on the screen.

In a further embodiment of the present invention, the projection system is provided with beam splitting means positioned between the projection lens and the rear projection screen for dividing the image projected by the lens into identical first and second images of the original image and for reflecting and directing the first and second images onto the screen in side-by-side relation. The magnifying system includes first and second interocularly spaced magnifying lenses optically aligned with the first and second images displayed on the screen for viewing an enlarged virtual image of said images displayed on the screen.

In a further embodiment of the present invention, means are provided for folding the optical path in the projection system by proper positioning of mirror elements so as to achieve a further compact design. This embodiment provides for the optical axis of the projection system to be inclined at an angle with respect to the optical axis of the magnifying system.

The foregoing and other features of the microform reader and the various elements of the present invention are more fully described with reference to the annexed drawings.

BRIEF DESCRIPTION OF THE DRAWINGS

There follows a detailed description of various embodiments of the present invention to be read together with the accompanying drawings wherein:

FIG. 1 is a schematic plan view of a first embodiment showing various elements of the invention using a projection system to project a real image on a screen, and a first type of magnifying system for viewing an enlarged image;

FIG. 2 is a schematic plan view of a second embodiment of the present invention utilizing a projection system substantially the same as that shown in FIG. 1, with a second type of magnifying system;

FIG. 3 is a schematic plan view of yet another embodiment of the present invention having a projecting system for projecting two identical real images in side-by-side relation onto a viewing screen in combination with yet another magnifying system.

DESCRIPTION OF THE INVENTION

Figure 4:
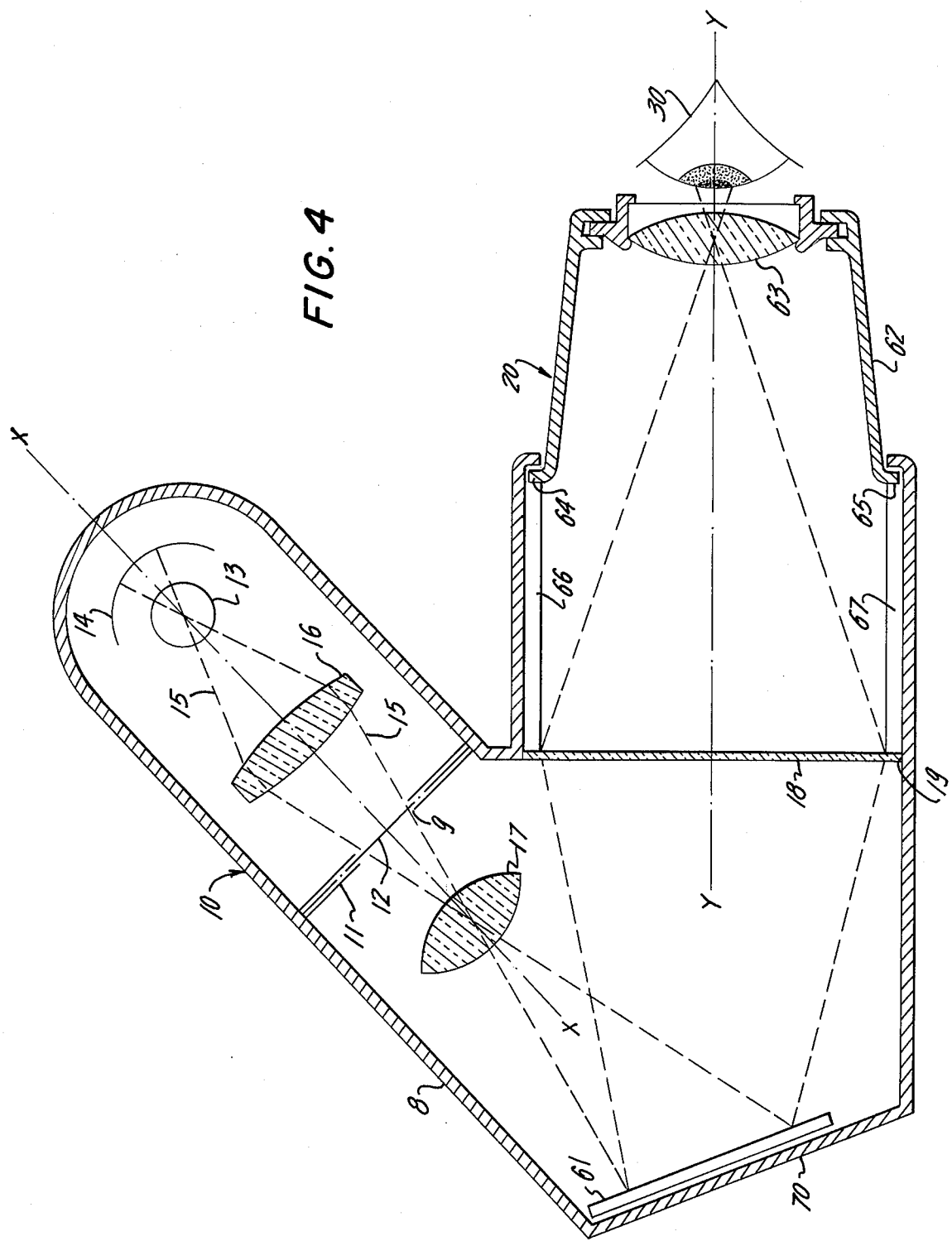
FIG. 4 is a schematic side view of an embodiment of the invention showing means for folding the projection path.

For purposes of illustration, the present invention is being described in connection with the attached schematic drawings, which show the principles of the invention in its simplest form. However, it will be understood that various modifications and alterations may be made with respect to means for support, choice of optical path of the projection system, use of mirrors to achieve further compact design, etc., when embodying the various elements shown herein within an appropriate housing. Such matters of design are, however, well within the skill of an artisan in this field.

Referring now in more detail to the accompanying drawings, FIG. 1 shows a first embodiment of the present invention comprising a projection system, indicated generally by the numeral 10, and a magnifying system, indicated generally by the numeral 20. The projection system and magnifying system are carried within a single light tight housing schematically shown by dot-dash lines as numeral 8, in order to achieve the compact objectives of the present invention.

The projection system 10 includes a microform carrier 11 having a projection gate 9 in which the portion 12 of the microform to be viewed is positioned. In the embodiment shown in FIG. 1, the microform is shown as a roll 7 of microfilm, however, it will be understood that other microform types, such as microfiche, may similarly be positioned within the carrier 11 so that a particular portion thereof may be positioned within the gate 9 for projection and viewing.

The various beams of light and image projections are shown as dotted lines.

In a well known manner, a source of illumination or lamp 13 with a reflector element 14 is carried within the housing of the reader device to provide a beam of light indicated by dashed lines 15 through a condenser lens 16. The lamp 13, reflector 14 and condensing lens 16 form the projection lamp assembly for projecting the light from the lamp through the portion of the microform 12 toward a projection lens 17 for projection on the rear side of a screen 18 carried by screen holder 19 which is supported within the housing of the reader device. The reflector is positioned so that the light from the lamp is properly directed through the condensing lens as shown in the figure.

With a projection lens having a focal length of 17mm, a portion of the microform 9mm wide can be projected onto the screen over an area of 72mm wide thus enlarging the real image on the screen by 8 times. Since an 8 times magnification of information carried on microforms commonly in use is insufficient for comfortable reading or viewing, the present invention provides for the additional magnifying system referred to generally as reference numeral 20. This system may take a number of convenient forms, and in the embodiment shown in FIG. 1 comprises a pair of magnifying lenses 22, 23 with respective prism elements 24, 25 to provide means for converging upon the image displayed on the screen 18. The function of the magnifying lenses and their respective prisms may of course be combined into a single lens element which performs the function of both magnifying and converging. The magnifying lenses are carried on a carriage 21 arranged for movement in a direction parallel to the optical axis X—X for focusing adjustment, as indicated by arrow "A". Since the entire projection and magnifying systems are to be enclosed in a light tight housing, the enclosures 26 provide additional means for eliminating ambient light from the magnifying system to thus minimize power requirements for illumination. Accordingly, the eyes 30 of the user can be positioned with respect to the enclosures so that viewing through the lens/prism arrangement will produce a convergent virtual image.

Satisfactory results have been achieved by using a prism having an angle $\alpha$ of 10° with magnifying lenses having a radius of curvature of 61mm. Depending upon the focusing requirements for the particular individual, the magnifying lens system will produce approximately 3 times magnification of the image appearing on the rear screen 18 when positioned between 77mm and 117mm from the screen.

In the embodiment shown in FIG. 2, the identical projection system 10, as shown in FIG. 1, is used to project a real image of the information carried on microform 12 onto the translucent screen 18. This embodiment differs from the embodiment shown in FIG. 1 by the arrangement of the magnifying system, which in this case is identified generally by reference numeral 40. In this magnifying system the use of prismatic converging elements is eliminated so that the virtual image appears as a result of straight viewing which eliminates possible distortion because of the requirements of convergence.

In this embodiment magnifying lenses 42 and 43 are carried on carriage 41, movable in the direction of arrow "B", and spaced apart to accommodate binocular viewing by the user. It should be noted that the spacing of the lenses in each of the embodiments described herein has been chosen so as to accommodate the average user whose interocular distance is between 2.25 and 2.5 inches.

Also carried on moveable carriage 41 is a first reflecting mirror 44, a second reflecting mirror 45, a third reflecting mirror 46 and a half-silvered mirror 47 which will produce reflection on one side and also allow light to pass therethrough. Each of the mirrors 44 through 47 are positioned at an angle of 45° with respect to the optical axis X—X so as to produce the desired reflections. Mirrors 44 and 45 are positioned at an angle of 45° with respect to the optical axis in a first direction, and mirrors 46 and 47 are positioned at an angle of 45° with respect to the optical axis in an opposite direction so that each eye of the user will see the image portrayed on the screen 18 without the necessity of convergence. To produce a virtual image for viewing at lens 42, light from the real image appearing on screen 18 will be reflected by half-silvered mirror 47 through an angle of 90° so as to direct such light to the reflecting mirror 46 where it will again be reflected through an additional angle of 90° for viewing through magnifying lens 42. To produce a virtual image at lens 43, the light from screen 18 forming the real image will pass through half-silvered mirror 47 and be reflected through an angle of 90° by reflecting mirror 45 so as to be directed to reflecting mirror 44 where it will again be reflected at an angle of 90° for viewing through magnifying lens 43.

Suitable choice of magnifying lens elements 42 and 43 will again produce a three times magnification of the image displayed on the screen 18 so that a total magnification of 24 times the size of the information carried on the microform will be produced as the virtual image seen by the user. Similar enclosures 48 are provided to minimize all ambient light entering the system.

In FIG. 3, a third embodiment is shown in which the information carried on the microform is projected and split by an appropriate beam splitting mirror arrangement to provide two identical side-by-side real images upon a rear projection screen for direct viewing through an appropriate magnification system. As in the prior embodiments, the image displayed on the screen has been enlarged and the simplified magnifying system shown in this embodiment will again magnify the image displayed on the screen so that the user will view a virtual image of the information carried on the microform magnified by 20-25 times its original size.

In this embodiment the light beam 15 from the condenser lens 16 is again directed to the projection gate 9 in the microform carrier 11 to illuminate the information carried on the microform 12 and which is projectedby projecting lens 17. The source of illumination is not shown, but is identical to that of the embodiments shown in FIGS. 1 and 2. The image of the information carried on the microform 12 is projected by the lens 17 onto a half-silvered mirror 54 which is positioned at an angle of 45° with respect to the optical axis X—X for reflection into beam 32 of the image through an angle of 90° so as to be directed to reflecting mirror 55. Reflecting mirror 55 is similarly oriented at an angle of 45° with respect to the optical axis and in a direction parallel to mirror 54, so as to again reflect the beam 32 of the image projected through lens 17 through a second 90° angle and to display a first image $I_1$ on screen 18'.

The beam projected by lens 17 is also allowed to pass through the half-silvered mirror 54 so that beam 33 will strike reflecting mirror 56 also positioned at an angle of 45° with respect to the optical axis so as to reflect the projected beam through an angle of 90° onto reflecting mirror 57 which is also oriented at an angle of 45° with respect to the optical axis and substantially parallel to mirror 56 so as to again reflect the beam 33 through a second angle of 90° and to project image $I_2$ onto screen 18' in a position adjacent image $I_1$. Images $I_1$ and $I_2$ are thus identical real images displayed on screen 18' of the information carried on microform 12 and enlarged, preferably by about six times its original size.

The magnifying system used in the embodiment of FIG. 3 simply comprises a pair of magnifying lenses 58 and 59 (with appropriate enclosures 60) for direct viewing of images $I_1$ and $I_2$ respectively. Lenses 58 and 59 may also be carried on a moveable holder or carriage for appropriate focusing adjustment.

With a projection lens 17 having a focal length of 20mm and a screen located approximately 140mm from the microform 12, a microform image having an original width of 9mm can be projected onto the screen to produce a pair of identical displayed images approximately 58mm in width. Use of appropriate magnifying lenses 58, 59 can increase the size of the virtual image to be viewed by an additional 3-4 times so that the image seen by the user can be approximately 24 times its original size with a reader accommodated in a housing having overall dimensions limited only by the optical path described above.

Accordingly, it can be seen that a viewer of very compact dimensions can be provided to produce a significantly large image for viewing which is easy to read with little discomfort in use.

An additional degree of compactness can be achieved by "folding" the beam for projecting a real image onto the screen. FIG. 4 shows one such example of folding the projected image by providing that the optical axis of the projection system X—X be oriented or arranged at an angle with respect to the optical axis Y—Y of the magnifying system. In the example shown in FIG. 4, this is accomplished by arranging the projection system 10 "above" the magnifying system 20 as seen schematically in the side elevational view of this Figure.

Folding mirror 61 is carried so that the beam 15 passing through the microform 12, which is held by carrier 11 and projected by lens 17, is reflected onto screen 18. The enlargement effect is of course identical to that portrayed in the previous embodiments so that the image displayed on screen 18 is 8 times the actual image carried on the microform.

FIG. 4 also illustrates an example of the compact housing 8, and of a carriage 62 which carries the magnifying lens 63 for movement toward or away from the screen 18 for focusing adjustment. In FIG. 4 the lens is shown at one extreme position, however, the carriage 62 can be moved toward the screen 18 since guide pins 64, 65 are carried in guide slots 66, 67 respectively of a portion of the housing 8 of which the screen holder 19 is a part. The folding mirror 61 can be supported on the back wall 70 of the housing.

It should be understood that the description of the embodiments herein is exemplary only. For example, the particular positioning of the various reflecting elements as being 45° with respect to the optical axis to produce 90° reflections is approximate only. Exact angular positioning to produce a particular angle of reflection will depend upon a number of design considerations, not essential for a full understanding of the invention.

Accordingly, the invention has been described and illustrated with respect to the embodiments shown herein, which produce satisfactory results, it wil be understood after appreciating the purpose of the invention, that various other changes and modification may be made without departing from the spirit and scope of the invention.

What I claim is:

1. A portable microform reader comprising a light tight housing, a microform holder carried by said housing for supporting therein a microform for viewing, a projection screen mounted within said housing, a projection system carried within said housing for projecting a pair of identical mono-images of a portion of said microform in side-by-side relation onto the rear side of said projection screen, said projection system including a source of illumination and means connected thereto for energizing said source of illumination, a condenser lens positioned between said source of illumination and said microform holder so as to direct a beam of illumination through a portion of a microform in said holder for viewing, a projection lens positioned for projecting an image of said portion of said microform toward said screen, and beam splitting means positioned between said projection lens and said screen for dividing the image projected by said lens into identical first and second images thereof and for reflecting said first and second images onto said screen in side-by-side relation, said projection screen supported within said housing and being translucent so that said identical pair of images may be viewed on the front side thereof, and a magnifying system having first and second magnifying lenses interocularly spaced for binocular viewing of said pair of images on the front side of said viewing screen, said screen being positioned between said magnifying system and said microform carrier, and said magnifying lenses being in optical alignment with said images on said screen for viewing an enlarged virtual mono-image thereof.

2. The portable microform reader according to claim 1 wherein said beam splitting means comprises a first half silvered mirror positioned between said projection lens and said screen for dividing said projected image into first and second image paths, said first image path being reflected by said half silvered mirror to a second mirror for reflection onto said screen in a first position, said second image path passing through said half silvered mirror for reflection by third and fourth mirrors onto said screen in a second position adjacent said first position so that said first and second image paths produce images identical to the image being projected from said microform to said beam splitting means.

3. The portable microform reader according to claim 1 further comprising mirror means for folding the optical path of said projected image so that the optical axis of said projection system is inclined at an angle with respect to the optical axis of said magnifying system.

4. The portable microform reader according to claim 1 further comprising means movably carrying said magnifying system on said housing for focusing adjustment.

5. A compact portable microform reader comprising a light-tight housing, a holder carried by said housing for supporting therein a microform for viewing, a translucent projection screen mounted within said housing, a source of illumination carried within said housing, a source of electrical power for energizing said source of illumination, a condenser lens positioned between said source of illumination and said holder for directing a beam of illumination through a portion of a microform being carried within said holder for viewing, a projection lens supported within said housing positioned between said holder and said screen for projecting an image of said portion of said microform toward said screen, a half silvered mirror located between said projection lens and said screen for dividing said image into first and second identical images and for directing said first and second identical images along first and second image paths, said first image path being reflected by said half silvered mirror and said second image path being allowed to pass through said half silvered mirror, a second mirror positioned for reflecting said first image path toward said screen so that said first identical image is projected onto said screen in a first position, third and fourth mirrors positioned for reflecting said second image path toward said screen to project said second identical image onto said screen in a second position in side-by-side relation with respect to said first position, whereby a pair of identical images representing said portion of said microform are displayed in side-by-side relation on said screen, and a magnifying system having first and second magnifying lenses interocularly spaced for viewing said pair of identical images on the front side of said viewing screen to produce an enlarged virtual mono-image thereof.

6. A portable microform reader comprising a light-tight housing, a holder carried by said housing for carrying therein a microform for viewing, a translucent projection screen carried within said housing, a projection system carried within said housing for projecting a pair of identical images of a portion of a microform carried by said holder onto the rear side of said projection screen, said projection system including a source of illumination, a source of electrical power for energizing said source of illumination, a condenser lens to direct a beam of illumination through said portion of the microform carried by said holder, a projection lens for directing an image of said portion of the microform toward the rear side of said screen, a beam splitting means including a half silvered mirror for dividing said image into first and second identical images and mirrors for reflecting said first and second identical images onto the rear side of said screen in side-by-side relation, said projection lens having a focal length and being positioned with said beam splitting means such that said first and second identical images projected onto said screen are enlarged by about six times the original size of said portion of said microform being projected, and a magnifying system having first and second magnifying lenses interocularly spaced for binocular viewing of said first and second identical images on the front side of said viewing screen for viewing an enlarged virtual mono-image thereof, said magnifying system being dimensioned and spaced from said screen a distance such that said virtual image is enlarged by an amount between three and four times the size of the images carried on said screen, so that the image viewed by the user is between eighteen and fifty-six times the size of the portion of the microform being projected.

* * * * *